United States Patent
Letts et al.

(10) Patent No.: US 12,358,190 B1
(45) Date of Patent: Jul. 15, 2025

(54) PROCESS TO YIELD FOAM CONSTRUCTION BOARDS WITH LOW SURFACE IRREGULARITIES

(71) Applicant: Holcim Technology Ltd, Zug (CH)

(72) Inventors: John B. Letts, Carmel, IN (US); Chunhua Yao, Carmel, IN (US); Mark Holtman, Nashville, TN (US)

(73) Assignee: Holcim Technology Ltd, Zug (CH)

( * ) Notice: Subject to any disclaimer, the term of this patent is extended or adjusted under 35 U.S.C. 154(b) by 772 days.

(21) Appl. No.: 17/577,989

(22) Filed: Jan. 18, 2022

Related U.S. Application Data (60) Provisional application No. 63/138,718, filed on Jan. 18, 2021.

(51) Int. Cl.
| | |
|---|---|
| *B29C 44/34* | (2006.01) |
| *B29C 44/32* | (2006.01) |
| *C08G 18/06* | (2006.01) |
| *C08J 9/04* | (2006.01) |
| *C08J 9/36* | (2006.01) |
| *B29K 75/00* | (2006.01) |
| *B29K 105/04* | (2006.01) |
| *B29L 31/00* | (2006.01) |

(52) U.S. Cl.
CPC .......... *B29C 44/348* (2013.01); *B29C 44/321* (2016.11); *C08G 18/06* (2013.01); *C08J 9/04* (2013.01); *C08J 9/36* (2013.01); *B29C 2793/009* (2013.01); *B29K 2075/00* (2013.01); *B29K 2105/04* (2013.01); *B29L 2031/776* (2013.01); *C08J 2203/10* (2013.01); *C08J 2203/12* (2013.01); *C08J 2203/142* (2013.01); *C08J 2203/16* (2013.01); *C08J 2375/04* (2013.01)

(58) Field of Classification Search
CPC ................................................. B29C 44/5627
See application file for complete search history.

(56) References Cited

U.S. PATENT DOCUMENTS

| | | | |
|---|---|---|---|
| 3,443,007 A | 5/1969 | Hardy | |
| 3,671,355 A | 6/1972 | Paymal | |
| 4,028,158 A * | 6/1977 | Hipchen | B29C 44/30 |
| | | | 156/181 |
| 4,212,917 A * | 7/1980 | Skowronski | C08G 18/7664 |
| | | | 521/902 |
| 4,347,281 A | 8/1982 | Futcher et al. | |
| 4,348,164 A | 9/1982 | Fujii et al. | |
| 4,411,949 A * | 10/1983 | Snider | C08G 18/4225 |
| | | | 427/244 |
| 4,572,865 A * | 2/1986 | Gluck | B32B 5/18 |
| | | | 264/258 |
| 4,710,521 A * | 12/1987 | Soukup | C08G 18/163 |
| | | | 264/DIG. 83 |

(Continued)

FOREIGN PATENT DOCUMENTS

| | | |
|---|---|---|
| EP | 1205501 | 5/2002 |

*Primary Examiner* — Benjamin A Schiffman
(74) *Attorney, Agent, or Firm* — Renner, Kenner; Arthur M. Reginelli (57) ABSTRACT

A method for producing a foam board laminate having low surface irregularities, the method comprising (i) preparing a continuous foam laminate; (ii) cutting the foam laminate to a desired length; (iii) placing the foam laminate of desired length into restriction to restrict further expansion of the foam laminate in the thickness of the foam laminate.

18 Claims, 1 Drawing Sheet

(56) References Cited

U.S. PATENT DOCUMENTS

| | | | | |
|---|---|---|---|---|
| 4,711,912 A | * | 12/1987 | Snider | B32B 29/007 |
| | | | | 521/902 |
| 4,764,420 A | * | 8/1988 | Gluck | B29C 44/326 |
| | | | | 427/373 |
| 5,312,848 A | * | 5/1994 | Klapper | C08G 18/4211 |
| | | | | 521/902 |
| 5,352,510 A | | 10/1994 | Laughlin et al. | |
| 5,405,884 A | * | 4/1995 | Londrigan | C08J 9/144 |
| | | | | 521/902 |
| 5,837,743 A | | 11/1998 | Londrigan et al. | |
| 6,093,481 A | * | 7/2000 | Lynn | B32B 5/20 |
| | | | | 428/317.9 |
| 2005/0222289 A1 | | 10/2005 | Miller | |
| 2006/0027948 A1 | * | 2/2006 | Grass | B32B 5/08 |
| | | | | 442/373 |
| 2013/0139471 A1 | | 6/2013 | Paradis et al. | |
| 2022/0324142 A1 | * | 10/2022 | Ulam | B29C 44/20 |

* cited by examiner

PROCESS TO YIELD FOAM CONSTRUCTION BOARDS WITH LOW SURFACE IRREGULARITIES

This application claims the benefit of U.S. Provisional Application Ser. No. 63/138,718 filed on Jan. 18, 2021, which is incorporated herein by reference.

FIELD OF THE INVENTION

Embodiments of the present invention are directed toward a process for producing foam (e.g. polyisocyanurate) construction boards having advantageously low surface irregularities.

BACKGROUND OF THE INVENTION

Knit-lines tend to form during conventional foam manufacturing methods as an expanding foam from one mix head meets with another expanding foam from an adjacent mix head. It is desirable to minimize the depth of these knit-lines within foam boards (e.g. polyisocyanurate boards). Knit-lines having a deleterious depth negatively impact the appearance and the R-Value of the foam boards. There remains a need in the art for a method to achieve foam boards having knit-lines with commercially suitable depth, which may also be referred to as the foam boards having low surface irregularities or having flat top and bottom surfaces.

Some attempts to minimize the depth of knit-lines have included manufacturing the foam boards from particular compositions. For example, U.S. Pat. No. 5,837,743 discloses the use of high acid polyester polyols, which purportedly enables the addition of more catalyst to result in flatter and more dimensionally stable foam boards.

Other attempts to minimize the depth of knit-lines have included compressing the foam boards during early stages of the polymerization of the foam. For example, U.S. Pat. No. 3,671,355 discloses maintaining a sufficiently high pressure during early polymerization in order to obtain a good surface condition. Also, European Patent EP 1205501 A1 discloses that compression generally takes place during the formation of the foam. The EP '501 patent discloses that the compression most preferably takes place at a time when the foam has reached about 60% of its maximum height.

SUMMARY OF THE INVENTION

One or more embodiments of the present invention provide a method for producing a foam board laminate having low surface irregularities, the method comprising (i) preparing a continuous foam laminate; (ii) cutting the foam laminate to a desired length; (iii) placing the foam laminate of desired length into restriction to restrict further expansion of the foam laminate relative to the thickness of the foam laminate.

Yet other embodiments of the present invention provide a method for producing a foam board having low surface irregularities, the method comprising (i) mixing an A-side stream and a B-side stream to thereby form a foam mixture; (ii) depositing the foam mixture onto a production line; (iii) allowing the foam mixture to expand for at least 20 seconds to thereby obtain an intermediate foam product; (iv) cross-cutting the intermediate foam product to thereby obtain a foam board; and (v) restricting the board from further expansion in at least one direction.

DETAILED DESCRIPTION OF ILLUSTRATIVE EMBODIMENTS

Figure 1:
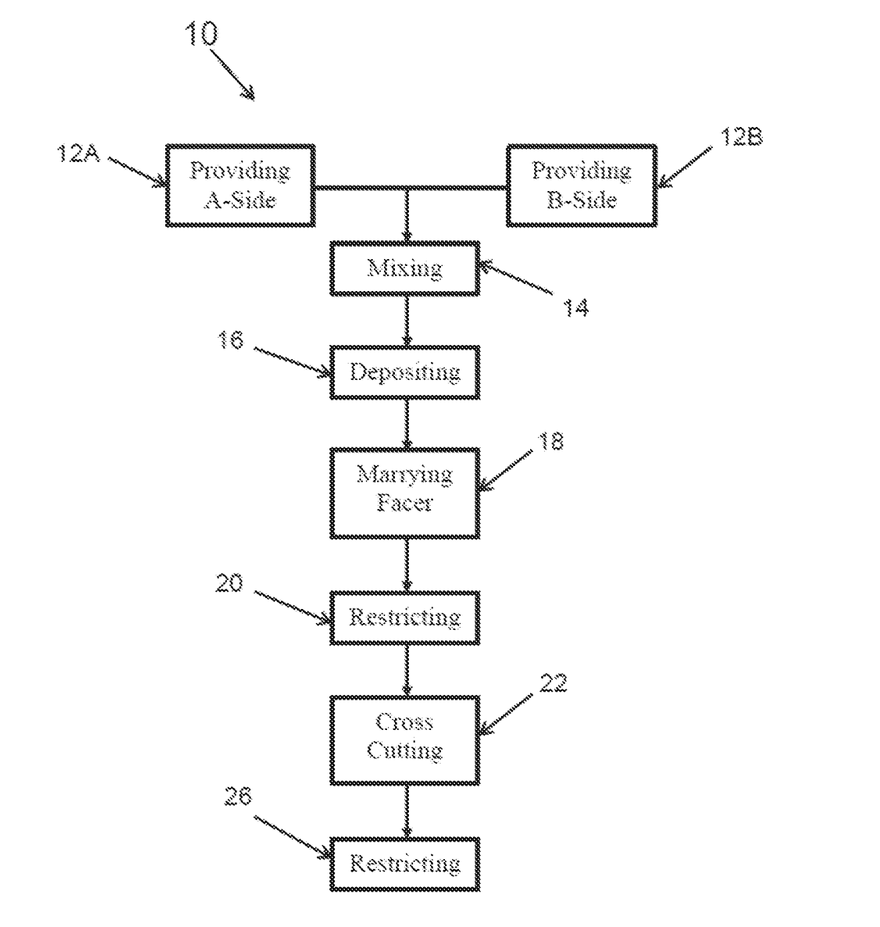
The FIGURE is a flow chart of a method according to embodiments of the present invention.

Embodiments of the invention are based, at least in part, on the discovery of a method for producing foam (e.g. polyisocyanurate) construction boards having advantageously low surface irregularities. Conventional methods of manufacturing construction foam boards, such as those boards made from a closed cell polyisocyanurate or polyurethane foam, tend to produce deleterious ruts, which are also referred to as knit-lines or corn rows, within the surface of the foam board. These knit-lines form as an expanding foam mass from one mix head meets with another expanding foam mass from an adjacent mix head, and as the two masses meet, they do not homogeneously combine. As the foam expands or rises, particularly in the vertical direction, knit-lines form because the foam material at the knit-line (i.e. the location where the masses meet) and the foam material not at the knit-line, which is referred to as the bulk foam material, vertically rise at different rates and heights. That is, the foam material at the bulk foam location rises faster and higher than the foam material at the knit-line. And, it has been discovered that relatively deep knit-lines are formed despite conventional manufacturing methods that include the use of a laminator, which restricts expansion of the foam during manufacture.

As the skilled person appreciates, conventional laminators generally include opposing conveyors that restrict the foam material from rising as the foam material passes through the laminator. It has been observed, however, that the foam material is conventionally removed from the laminator prior to complete expansion of the foam material, and this continued expansion of the foam material after leaving the laminator contributes to formation of the knit-lines. Embodiments of the present invention therefore provide a method for producing foam boards by restricting growth of the foam after removing the foam from a laminator.

Method—Overall

In one or more embodiments, foam construction boards are initially prepared by using conventional techniques. For example, processes and techniques for the production of polyurethane or polyisocyanurate construction boards (known as boardstock) are generally known as described in U.S. Pat. Nos. 10,000,922; 8,153,039; 7,838,568; 7,612,120; 7,387,753; 6,117,375; 6,044,604; 5,891,563; 5,573,092; as well as U.S. Publication Nos. 2019/0061313; 2006/0179749; 2004/0109983; 2003/0082365; 2003/0153656; 2003/0032351; and 2002/0013379, which are each incorporated herein by reference.

In one or more embodiments, these conventional techniques generally include (i) providing reactant streams, (ii) combining reactant streams to form a foam mixture, (iii) depositing the foam mixture onto a facer from multiple mix heads, which thereby forms multiple rising foam masses on the facer, (iv) optionally allowing the multiple foam masses to merge into a single foam mass, (v) contacting a second facer to the rising foam masses or the single foam mass to form a foam board precursor, (vi) restricting the foam board precursor within a laminator to form a continuous foam board, (vii) removing the foam precursor from the laminator, and (viii) cross-cutting the continuous foam board to form construction boards of desired length. These conventional techniques may also optionally include heating the foam or foam board precursor at one or more steps (e.g. within the laminator). These techniques may also include one or more post-laminator fabrication steps such as lateral trimming where the sides of the continuous foam construction board or the cross-cut construction boards are trimmed in the machine direction. Those skilled in the art also appreciate that the cross-cutting step can take place in multiple steps; for example, the continuous foam construction board can be cut to a first length (e.g. 8 ft. in length), and then these boards can be subsequently cut to a second length (e.g. 4 ft. in length) in a second cross-cutting step.

According to embodiments of this invention, the boards are restricted subsequent to removing the boards from the laminator. In a first embodiment, this second restricting step takes place after cross-cutting the continuous foam board, which may also be referred to as a continuous foam construction board. These embodiments can be described with reference to the FIGURE. Foam production method 10 includes step 12A of providing an A-side stream of reagents and a step 12B of providing a B-side stream of reagents. The A-side stream and the B-side stream are mixed in step 14 (mixing step 14) within, for example, a plurality of mix heads. This step of mixing the A-side stream and the B-side streams forms a reaction mixture, which may also be referred to as a foam reaction mixture or simply a foam mixture. The reaction mixture is then deposited in step 16 (depositing step 16) onto a facer from multiple sources (e.g. multiple mix heads). As those skilled in the art appreciate, the facer is conveyed toward a laminator as it receives the foam mixture, and the plurality of foam masses formed on the facer from the multiple sources generally flow toward each other to form a continuous foam mass across the width of the facer. A second facer is positioned over the rising foam mixture (i.e. rising foam mass) in step 18 (facer marrying step 18). As the skilled person appreciates, the second facer is typically supplied from a pour roller, and the reaction mixture rises to become married to the second facer to form a precursor construction board, which is generally a continuous composite structure with upper and lower facers sandwiching a rising foam mass. This precursor construction board is then conveyed to step 20 where the precursor board is restricted from further growth, particularly in the vertical direction (restricting step 20). As the skilled person appreciates, step 20 conventionally takes place in a laminator, which generally includes an opposed set of conveyer belts or plate assemblies that are adapted to restrict the precursor board as it is sandwiched between and advanced by the opposed conveyors or plate assemblies. To the extent that the precursor board has a thickness that is greater than the gap set within the laminator, the laminator not only restricts further growth of the precursor board but also applies pressure to adjust the height of the board. As noted above, heat may be supplied to the precursor board while in the laminator (e.g. from heated laminator plates), or the overall environment within the laminator may be maintained to provide for appropriate reaction conditions within the laminator. This can be accomplished by heating the laminator or the environment in which the laminator is contained. Likewise, the laminator or the environment in which the laminator is contained may be adapted to provide multiple heating zones where the precursor board can be exposed to different temperature or overall heat conditions. Those skilled in the art also appreciate that the foam construction boards can be prepared without facers as described in U.S. Pat. No. 6,117,375, which is incorporated herein by reference, and the skilled person can readily adapt the process steps of the present invention to adapt for practicing the claimed invention without the use of facers.

Although the foaming reaction may not be complete upon removing the board from the laminator, reference can be made to a continuous foam construction board for the product removed from the laminator. After removal from the laminator, the continuous foam construction board undergoes cross-cutting at step 22 (cross-cutting step 22) to form individual foam construction boards having a desired length (which as indicated above may be a first length where multiple cross-cutting steps are involved). After step 22, these individual foam construction boards are then placed into restriction at step 26 (second restricting step 26) pursuant to embodiments of the invention. As indicated above, the process may include one or more additional steps such as, but not limited to, a finishing step where the boards are trimmed to width. This step may take place before or after step 22 of cross-cutting. Other finishing steps may include heating or cooling the boards, wrapping or otherwise packaging the boards, stacking the boards, storing the boards, and shipping the boards. In one or more embodiments, restricting step 26 takes place after trimming the boards to a desired width.

Providing and Mixing A-Side and B-Side Reactant Streams

In one or more embodiments, the foam is prepared by mixing a first stream that includes an isocyanate-containing compound with a second stream that includes an isocyanate-reactive compound. Using conventional terminology, the first stream (i.e., the stream including an isocyanate-containing compound) may be referred to as an A-side stream, an A-side reactant stream, or simply an A stream. Likewise, the second stream (i.e., the stream including an isocyanate-reactive compound) may be referred to as a B-side stream, B-side reactant stream, or simply B stream. In one or more embodiments, either stream may carry additional ingredients including, but not limited to, flame-retardants, surfactants, blowing agents, catalysts, emulsifiers/solubilizers, fillers, fungicides, anti-static substances, and mixtures of two or more thereof.

In one or more embodiments, the A-side stream may only contain the isocyanate-containing compound. In one or more embodiments, multiple isocyanate-containing compounds may be included in the A-side. In other embodiments, the A-side stream may also contain other constituents such as, but not limited to, flame-retardants, surfactants, blowing agents and other non-isocyanate-reactive components. In one or more embodiments, the complementary constituents added to the A-side are non-isocyanate reactive. And, as suggested above, the A-side may include the acyclic pentane blowing agent and the blowing agent additive in accordance with the present invention. In other embodiments, the A-side is devoid or substantially devoid of the acyclic blowing agent and the blowing agent additive.

Suitable isocyanate-containing compounds useful for the manufacture of polyisocyanurate construction board are generally known in the art and embodiments of this invention are not limited by the selection of any particular isocyanate-containing compound. Useful isocyanate-containing compounds include polyisocyanates. Useful polyisocyanates include aromatic polyisocyanates such as diphenyl methane diisocyanate in the form of its 2,4'-, 2,2'-, and 4,4'-isomers and mixtures thereof. The mixtures of diphenyl methane diisocyanate (MDI) and oligomers thereof may be referred to as "crude" or polymeric MDI, and these polyisocyanates may have an isocyanate functionality of greater than 2. Other examples include toluene diisocyanate in the form of its 2,4' and 2,6'-isomers and mixtures thereof, 1,5-naphthalene diisocyanate, and 1,4' diisocyanatobenzene. Exemplary polyisocyanate compounds include polymeric Rubinate 1850 (Huntsmen Polyurethanes), polymeric Lupranate M70R (BASF), and polymeric Mondur 489N (Bayer).

In one or more embodiments, the B-side stream may only include the isocyanate-reactive compound. In one or more embodiments, multiple isocyanate-reactive compounds may be included in the B-side. In other embodiments, the B-side stream may also contain other constituents such as, but not limited to, water, flame-retardants, surfactants, blowing agents and other non-isocyanate-containing components. In particular embodiments, the B-side includes an isocyanate reactive compound, the acyclic pentane blowing agent, and the blowing agent additive. In these or other embodiments, the B-side may also include flame retardants, catalysts, emulsifiers/solubilizers, surfactants, fillers, fungicides, antistatic substances, and other ingredients that are conventional in the art.

An exemplary isocyanate-reactive compound is a polyol. The term polyol, or polyol compound, includes diols, polyols, and glycols, which may contain water as generally known in the art. Primary and secondary amines are suitable, as are polyether polyols and polyester polyols. In particular embodiments, aromatic polyester polyols are employed. Exemplary polyester polyols include phthalic anhydride based PS-2352 (Stepan), phthalic anhydride based polyol PS-2412 (Stepan), terephthalic based polyol 3522 (Invista), and a blended polyol TR 564 (Huntsman). Useful polyether polyols include those based on sucrose, glycerin, and toluene diamine. Examples of glycols include diethylene glycol, dipropylene glycol, and ethylene glycol. Suitable primary and secondary amines include, without limitation, ethylene diamine, and diethanolamine. In one or more embodiments, a polyester polyol is employed. In one or more embodiments, the present invention may be practiced in the appreciable absence of any polyether polyol. In certain embodiments, the ingredients are devoid of polyether polyols.

Catalysts, which are believed to initiate the polymerization reaction between the isocyanate and the polyol, as well as a trimerization reaction between free isocyanate groups when polyisocyanurate foam is desired, may be employed. While some catalysts expedite both reactions, two or more catalysts may be employed to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris[(dimethylamino) methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Surfactants, emulsifiers, and/or solubilizers may also be employed in the production of polyurethane and polyisocyanurate foams in order to increase the compatibility of the blowing agents with the isocyanate and polyol components. Surfactants may serve two purposes. First, they may help to emulsify/solubilize all the components so that they react completely. Second, they may promote cell nucleation and cell stabilization.

Exemplary surfactants include silicone co-polymers or organic polymers bonded to a silicone polymer. Although surfactants can serve both functions, it may also be useful to ensure emulsification/solubilization by using enough emulsifiers/solubilizers to maintain emulsification/solubilization and a minimal amount of the surfactant to obtain good cell nucleation and cell stabilization. Examples of surfactants include Pelron surfactant 9920, Evonik B8489, and GE 6912. U.S. Pat. Nos. 5,686,499 and 5,837,742 are incorporated herein by reference to show various useful surfactants.

Suitable emulsifiers/solubilizers include DABCO Ketene 20AS (Air Products), and Tergitol NP-9 (nonylphenol+9 moles ethylene oxide).

Flame retardants may be used in the production of polyurethane and polyisocyanurate foams, especially when the foams contain flammable blowing agents such as pentane isomers. Useful flame retardants include tri(monochloropropyl) phosphate (a.k.a. tris(cloro-propyl) phosphate), tri-2-chloroethyl phosphate (a.k.a tris(chloro-ethyl) phosphate), phosphonic acid, methyl ester, dimethyl ester, and diethyl ester. U.S. Pat. No. 5,182,309 is incorporated herein by reference to show useful blowing agents.

In one or more embodiments, the blowing agent includes one or more pentane isomers selected from n-pentane, isopentane, cyclopentane and mixtures thereof. In particular embodiments, the pentane blowing agent is an acyclic pentane such as isopentane, n-pentane, or mixtures thereof. In some embodiments, the acyclic pentane is a blend of n-pentane and isopentane. In this respect, U.S. Pat. Nos. 7,612,120, 7,838,568, 8,106,106 and 8,453,390 are incorporated herein by reference.

In other embodiments, the blowing agent (physical blowing agent) may include halogenated organic compounds including, but not limited to, halocarbons and halogenated olefins (HFOs).

Additionally, in one or more embodiments, the blowing agent may include a blowing agent additive such as, but not limited to, low molecular weight aldehydes or ketones, esters, aromatic hydrocarbons, and halogenated hydrocarbons and ethers.

In one or more embodiments, the blowing agent may include a chemical blowing agent such as water.

An isocyanurate is a trimeric reaction product of three isocyanates forming a six-membered ring. The ratio of the equivalents of NCO groups (provided by the isocyanate-containing compound or A-side) to isocyanate-reactive groups (provided by the isocyanate-containing compound or B side) may be referred to as the index or ISO index. When the NCO equivalents to the isocyanate-reactive group equivalents is equal, then the index is 1.00, which is referred to as an index of 100, and the mixture is said to be stoichiometrically equal. As the ratio of NCO equivalents to isocyanate-reactive groups equivalents increases, the index increases. Above an index of about 150, the material is generally known as a polyisocyanurate foam, even though there are still many polyurethane linkages that may not be trimerized. When the index is below about 150, the foam is generally known as a polyurethane foam even though there may be some isocyanurate linkages. For purposes of this specification, reference to polyisocyanurate and polyurethane will be used interchangeably unless a specific ISO index is referenced.

In one or more embodiments, the concentration of the isocyanate-containing compound to the isocyanate-reactive compounds within the respective A-side and B-side streams is adjusted to provide the foam product with an ISO index of at least 150, in other embodiments at least 170, in other embodiments at least 190, in other embodiments at least 210, in other embodiments at least 220, in other embodiments at least 225, in other embodiments at least 230, in other embodiments at least 235, in other embodiments at least 240, in other embodiments at least 245, and in other embodiments at least 250. In these or other embodiments, the concentration of the isocyanate-containing compound to the isocyanate-reactive compounds within the respective A-side and B-side streams is adjusted to provide the foam product with an ISO index of at most 400, in other embodiments at most 350, and in other embodiments at most 300. In one or more embodiments, the concentration of the isocyanate-containing compound to the isocyanate-reactive compounds within the respective A-side and B-side streams is adjusted to provide the foam product with an ISO index of from about 150 to about 400, in other embodiments from about 170 to about 350, and in other embodiments from about 190 to about 330, and in other embodiments from about 220 to about 280.

In one or more embodiments, the amount of physical blowing agent (i.e., acyclic pentane and blowing agent additive) used in the manufacture of polyisocyanurate foam construction board according to the present invention may be described with reference to the amount of isocyanate-reactive compound employed (e.g., polyol). For example, in one or more embodiments at least 12, in other embodiments at least 14, and in other embodiments at least 18 parts by weight physical blowing agent per 100 parts by weight of polyol may be used. In these or other embodiments, at most 40, in other embodiments at most 36, and in other embodiments at most 33 parts by weight physical blowing agent per 100 parts by weight of polyol may be used. In one or more embodiments from about 12 to about 40, in other embodiments from about 14 to about 36, and in other embodiments from about 18 to about 33 of physical blowing agent per 100 parts by weight of polyol may be used.

In one or more embodiments, the amount of physical blowing agent (i.e., acyclic pentane and blowing agent additive), optionally together with any chemical blowing agent employed, used in the manufacture of polyisocyanurate foam construction board according to the present invention may be described with reference to the density of the resulting foam. In other words, the skilled person appreciates that the amount of blowing agent employed has a direct impact on the density of the foam produced, and these amounts can be determined without undue calculation or experimentation. Accordingly, in one or more embodiments, the amount of blowing agent employed (both physical and chemical blowing agent) is tailored to produce a foam having a density (as determined by ASTM C303-10) of from about 1.0 to about 2.5 lbs/ft$^3$, in other embodiments from about 1.2 to about 2.2 lbs/ft$^3$, in other embodiments from about 1.4 to about 2.0 lbs/ft$^3$, and in other embodiments from about 1.5 to about 1.8 lbs/ft$^3$. In particular embodiments, the amount of blowing agent employed is tailored to produce a foam having a density of less than 2.5 lbs/ft$^3$, in other embodiments less than 2.2 lbs/ft$^3$, in other embodiments less than 2.0 lbs/ft$^3$, and in other embodiments less than 1.8 lbs/ft$^3$.

In one or more embodiments, the amount of surfactant (e.g., silicone copolymer) used in the manufacture of polyisocyanurate foam construction board according to the present invention may be described with reference to the amount of isocyanate-reactive compound employed (e.g. polyol). For example, in one or more embodiments, at least 1.0, in other embodiments at least 1.5, and in other embodiments at least 2.0 parts by weight surfactant per 100 parts by weight of polyol may be used. In these or other embodiments, at most 5.0, in other embodiments at most 4.0, and in other embodiments at most 3.0 parts by weight surfactant per 100 parts by weight of polyol may be used. In one or more embodiments, from about 1.0 to about 5.0, in other embodiments from about 1.5 to about 4.0, and in other embodiments from about 2.0 to about 3.0 of surfactant per 100 parts by weight of polyol may be used.

In one or more embodiments, the amount of flame retardant (e.g., liquid phosphates) used in the manufacture of polyisocyanurate foam construction board according to the present invention may be described with reference to the amount of isocyanate-reactive compound employed (e.g. polyol). For example, in one or more embodiments, at least 5, in other embodiments at least 10, and in other embodiments at least 12 parts by weight flame retardant per 100 parts by weight of polyol may be used. In these or other embodiments, at most 30, in other embodiments at most 25, and in other embodiments at most 20 parts by weight flame retardant per 100 parts by weight of polyol may be used. In one or more embodiments, from about 5 to about 30, in other embodiments from about 10 to about 25, and in other embodiments from about 12 to about 20 of flame retardant per 100 parts by weight of polyol may be used.

In one or more embodiments, the amount of catalyst(s) employed in practice of the present invention can be readily determined by the skilled person without undue experimentation or calculation. Indeed, the skilled person is aware of the various process parameters that will impact the amount of desired catalyst.

In one or more embodiments, the amount of physical blowing agent (i.e. pentane together with the amount of blowing agent additives) that is employed is sufficient to provide a foam having a foam density (ASTM C303-10) that is less than 2.5 pounds per cubic foot (12 kg/m$^2$), in other embodiments less than 2.0 pounds per cubic foot (9.8 kg/m$^2$), in other embodiments less than 1.9 pounds per cubic foot (9.3 kg/m$^2$), and still in other embodiments less than 1.8 pounds per cubic foot (8.8 kg/m$^2$). In one or more embodiments, the amount of blowing agent (together with the amount of blowing agent additives) that is employed is sufficient to provide a density that is greater than 1.50 pounds per cubic foot (7.32 kg/m$^2$), or in other embodiments, greater than 1.55 pounds per cubic foot (7.57 kg/m$^2$).

As suggested above, the construction boards of the present invention may be produced in the presence of a chemical blowing agent in addition to the physical blowing agents described above. The presence of excessive amounts of chemical blowing agents, such as water, has a deleterious impact on the overall balance of properties of the construction boards of the present invention. Accordingly, in one or more embodiments, the amount of chemical blowing agent employed in the manufacture of the construction boards of this invention, such as water, is limited. Accordingly, the amount of chemical blowing agent (e.g., water) included within the foam-forming ingredients according to the present invention, particularly the B-side stream of reactants) is less than 1.5, in other embodiments less than 1.3, in other embodiments less than 1.0, in other embodiments less than 0.8, in other embodiments less than 0.6, and in other embodiments less than 0.4 parts by weight chemical blowing agent (e.g., water) per 100 parts by weight of the isocyanate-reactive component (e.g., 100 parts by weight polyol, php).

The skilled person understands that the ingredients employed in the manufacture of polyurethane-polyisocyanurate foams in accordance with the present invention employs ingredients that inherently include water. Thus, unless efforts are made to remove water from the ingredients, certain levels of water are inherently introduced to the reaction mixture. It is conventionally believed that the amount of water inherently present within the reactants is about 0.15 to about 0.2 parts by weight water per 100 parts by weight polyol (php). Accordingly, the total amount of chemical blowing agent within the foam forming mixture includes the amount of inherent water within the reactants plus any added chemical blowing agent, such as added water. In one or more embodiments, chemical blowing agent, particularly water, may be added to the foam-forming ingredients while staying within the maximum amounts set forth above. For example, in one or more embodiments, from about 0.1 to about 0.8, in other embodiments from about 0.2 to about 0.7, and in other embodiments from about 0.25 to about 0.6 parts by weight water per 100 parts by weight polyol (php) may be added to the foam forming ingredients. In particular embodiments, the chemical blowing agent is added to the B-side stream of reactants.

In one or more embodiments, the respective streams (12A and 12B) are mixed within, for example, a mixhead such an impingement mixhead. In particular embodiments, mixing takes place at a temperature of from about 5 to about 45° C. In these or other embodiments, mixing takes place at a pressure in excess of 1,000, in other embodiments in excess of 1,500, and in other embodiments in excess of 2,000 psi.

Depositing Foam Mixture

As indicated above, the foam mixture is deposited onto a facer that is positioned on and carried by a conveyor system. In one or more embodiments, depositing step 16 occurs at a position at least two feet prior to restricting step 18, in other embodiments at least three feet, and in other embodiments at least four feet prior to restricting step 18. In one or more embodiments, depositing step 16 occurs at a position from one foot to eight feet prior to first restricting step 18, in other embodiments from two feet to six feet, and in other embodiments from three feet to five feet prior to first restricting step 18.

In one or more embodiments, the foam mixture is deposited onto a facer from multiple mix heads thereby initially forming multiple masses of foaming mixture on the facer. In particular embodiments, the foam is deposited from greater than 2 mix heads, in other embodiments greater than 3 mix heads, and in other embodiments greater than 4 mix heads. In one or more embodiments, the foam is deposited from about 2 to about 10, in other embodiments from about 3 to about 8, and in other embodiments from about 3 to about 6 mix heads onto the facer.

The skilled person will appreciate that the step of depositing the foam mixture onto a facer includes the substep of providing a facer material. In conventional fashion, the facer is typically supplied from a roll. The facer may include a variety of materials such as, but not limited to, cellulosic fabrics such as coated cellulosic materials, non-woven glass mats such as fiberglass mats and coated fiberglass mats, polymeric fabrics such as those non-woven fabrics made from polymeric filaments, and films including polymeric and metallic films (e.g. foils). In these or other embodiments, the facers may include cellulosic fiber mats or fabrics, reinforced cellulosic fiber mats, craft paper, coated glass fiber mats, uncoated glass fiber mats, chopped glass fabrics, and combinations thereof. Useful facer materials are known to the skilled person as described in U.S. Pat. Nos. 10,000,922; 6,774,071; 6,355,701; 6,044,604; and 5,891,563, which are incorporated herein by reference. In one or more embodiments, the facers employed in the present invention have conventional widths, which are generally from about 2 to about 6, or about 3 to about 5 feet in width.

As suggested above, the foam material masses merge into a single foam mass on the facer and in so doing form knit-lines at the locations that respective foam masses converge, and the foam mass between knit-lines is referred to as bulk foam material.

Marrying Upper Facer to Rising Foam Mass

In one or more embodiments, a second facer is married to the foam mixture that was deposited onto the first facer. This facer, which may be the same or different than the first facer, is fed from a roller such as a pour roller. The foam composite or foam laminate formed by marrying the upper facer to the rising foam (which is disposed on the lower facer) may be referred to as foam board precursor or foam construction board precursor.

First Restricting Step—within Laminator

As indicated above, restricting step 20, which may be referred to as first restricting step 20, is the first of two steps of restricting the foam construction boards, or precursors thereof.

In one or more embodiments, first restricting step 20 takes place within a laminator.

In one or more embodiments, restricting step 20 may include providing the foamable mixture to a heated environment having a suitable temperature to thereby facilitate polymerization and trimerization of the reactants, and further expand the foamable mixture. In one or more embodiments, restricting step 18 takes place at temperature of at least 125° F., in other embodiments at least 130° F., in other embodiments at least 140° F., in other embodiments at least 150° F., in other embodiments at least 175° F., and in other embodiments at least 200° F. In one or more embodiments, restricting step 18 takes place at a temperature of from about 125° F. to about 200° F., in other embodiments from about 130° F. to about 170° F., in other embodiments from about 140° F. to about 165° F., and in other embodiments from about 150° F. to about 160° F.

In one or more embodiments, restricting step 20 occurs for at least 60 feet of a process line, in other embodiments, at least 80 feet, and in other embodiments, at least 100 feet. In one or more embodiments, restricting step 18 occurs for from about 50 feet to about 150 feet of a process line, in other embodiments, from about 70 feet to about 130 feet, and in other embodiments, from about 80 feet to about 120 feet.

In one or more embodiments, restricting step 18 occurs for greater than 10 seconds, in other embodiments greater than 20 seconds, in other embodiments greater than 25 seconds, and in other embodiments greater than 30 seconds. In these or other embodiments, restricting step 18 occurs for less than 60 seconds, in other embodiments less than 50 seconds, in other embodiments less than 45 seconds, and in other embodiments less than 40 seconds. In these or other embodiments, restricting step 18 occurs for about 20 to about 60 seconds, in other embodiments for about 25 to about 50 seconds, and in other embodiments for about 30 to about 45 seconds.

As suggested above, restricting step 20 may take place within a laminator. Laminators are generally known in the art and include an apparatus for applying pressure and/or restricting growth of a foam composite (e.g. force is applied in the form of a restriction to the top surface and/or the bottom surface of the composite or laminate within the laminator). In one or more embodiments, the laminator provides a pressure to the top surface and/or the bottom surface of the foamable mixture of greater than 2 psi, in other embodiments, greater than 4 psi, in other embodiments, greater than 5 psi, and in other embodiments, greater than 6 psi. In these or other embodiments, the laminator provides an initial pressure to the top surface and/or the bottom surface of the foamable mixture of less than 8 psi, in other embodiments, less than 7 psi, in other embodiments, less than 6 psi, and in other embodiments, less than 5 psi. In these or other embodiments, the laminator provides an initial pressure to the top surface and/or the bottom surface of the foam of about 2 to about 8 psi, in other embodiments of about 4 to about 7 psi, and in other embodiments of about 5 to about 6 psi.

Cross Cutting

As indicated above, the continuous foam construction is board is freed of restriction from restricting step 20 by, for example, removing the continuous foam construction board from a laminator, and then continuous foam construction board is cross cut to a desired length in cross-cutting step 22. Those skilled in the art appreciate that methods for the manufacture of foam construction boards may include multiple cross-cutting steps where the final desired length of the boards may require subsequent cross-cutting steps; e.g. the continuous board is cut to a first length (e.g. 16 feet) and then subsequently cut to smaller lengths (e.g. 8 feet). Therefore, reference may be made to first and second cross-cutting steps. That said, relative to the present invention, the subsequent step of restricting takes place after the initial cross-cutting step and optionally after any subsequent cross-cutting steps. Those skilled in the art also appreciate that cross cutting refers to cutting in a direction perpendicular to the machine direction. In one or more embodiments, the boards (either continuous or cut) may be cut using gang saws or multi-blade saws.

Second Restricting Step

As indicated above, second restricting step 26 takes place after cross-cutting step 22.

In one or more embodiments, subsequent restricting step 26 occurs at least two feet after restricting step 18, in other embodiments at least three feet, and in other embodiments at least five feet after restricting step 18. In one or more embodiments, restricting step 26 occurs within from about one foot to about eight feet after restricting step 18, in other embodiments from about two feet to about six feet, and in other embodiments from about three feet to about five feet of restricting step 18.

Restricting step 26 may be accomplished by use of an apparatus capable of restricting the expansion of the foam construction boards. In one or more embodiments, this is accomplished by placing the construction board between a pair of opposing restriction implements. The restricting apparatus may provide a sole function of restricting or may provide the function of restricting along with another function.

In one or more embodiments, step 26 may take place by simultaneously restricting multiple boards. For example, a plurality of boards may be stacked in a bundle, and the entire bundle placed within a restriction apparatus or device.

Exemplary restriction implements include opposing parallel plates. These plates may be mechanically fixed in place in order to provide the restriction. This mechanically fixed position may include fixedly positioning the restriction implements to a thickness corresponding to a desired thickness for a final foam product. In these or other embodiments, the restriction implements (e.g. parallel plates) may be acted on by a tool, such as a lever or screw, in order to act as a vise-like apparatus. In these or other embodiments, a hydraulic and/or pneumatic force may be acting on the restriction implements. In one or more embodiments, the restriction implements may include a plurality of pairs of compressing implements. That is, the restriction implements may include two or more pairs of opposing parallel plates that contact the foam. Other suitable numbers may be utilized.

By any of the above discussed techniques or other suitable technique, the restriction implements operate by restricting the foam that continues to expand. That is, a first restriction implement restricts the top surface of the foam and a second restriction implement restricts the bottom surface of the foam. The second restriction implement may be the ground, or other similar substrate fixedly positioned with the ground.

As discussed above, second restricting step 26 generally includes restricting the expansion of the foam product between a pair of opposing restriction implements. The restriction is therefore in a direction parallel to the axis of rising of the foam, or height of the foam, and perpendicular to the length and width dimensions of the foam construction board. In one or more embodiments, the opposing restriction implements are fixedly positioned such that the restriction implements do not apply a force to the foam surfaces to thereby reduce the thickness of the board, but rather the fixed position is such to maintain the thickness of the board.

According to embodiments of the invention, it is desirable that restricting step 26 maintain the growth of the foam material at the knit-lines and the growth of the bulk foam material at similar rates. As indicated above, it is believed that the bulk foam material grows at a higher rate and to a higher maximum height (i.e. if not restricted) relative to the foam material at the knit-lines.

In one or more embodiments, restricting step 26 maintains the height of the bulk foam material at a maximum height of about 100% of the maximum height of the foam material at the knit-lines, in other embodiments about 100.2%, in other embodiments about 100.5%, in other embodiments about 101%, in other embodiments about 102%, in other embodiments about 103%, and in other embodiments about 104% of the maximum height of the foam at the knit-lines. In one or more embodiments, restricting step 26 maintains the height of the bulk foam material at a maximum height of from about 100% to about 104%, in other embodiments from about 101% to about 104%, in other embodiments from about 100.2% to about 103%, in other embodiments from about 100.2% to about 102%, and in other embodiments from about 100.5% to about 101% of the maximum height of the foam material at the knit-lines.

In one or more embodiments, restricting step 26 occurs while the bulk foam material is expanding at a growth rate of greater than 101%, in other embodiments greater than 102%, in other embodiments greater than 104%, and in other embodiments greater than 110% of a growth rate of the foam material at the knit-line. In these or other embodiments, restricting step 26 occurs while the bulk foam material is expanding at a growth rate of less than 115%, in other embodiments less than 110%, in other embodiments less than 108%, and in other embodiments less than 106% of a growth rate of the foam material at the knit-line. In one or more embodiments, restricting step 26 occurs while the bulk foam material is expanding at a growth rate of about 101% to about 115%, in other embodiments about 102% to about 110%, in other embodiments about 104% to about 108%, and in other embodiments about 100% to about 110% of a growth rate of the foam material at the knit-line.

In one or more embodiments, restricting step 26 serves to maintain any difference between the height of the bulk foam material relative to the foam at the knit-line within a maximum differential of at most 0.125", in other embodiments at most 0.08", in other embodiments at most 0.06", in other embodiments at most 0.04", in other embodiments at most 0.02", and in other embodiments at most 0.01".

The skilled person understands that the foam rises a certain height per a given amount of time. This rise rate generally decreases over time, until the rate 0, which is when the foam has reached about 100% of its maximum height. In one or more embodiments, restricting step 26 occurs when the rise rate is less than 0.02 inches/minute, in other embodiments, less than 0.04 inches/minute, and in other embodiments, 0.08 inches/minute. In one or more embodiments, restricting step 26 occurs when the rise rate is about 0.02 inches/minute, in other embodiments, about 0.04 inches/minute, and in other embodiments, about 0.08 inches/minute.

The skilled person also understands that the foam rise characteristics can be quantified based upon a maximum height of rise, which is the height that the foam composite will rise under normal conditions without being restricted. In one or more embodiments, restricting step 26 occurs when the bulk foam material is at least at 70%, in other embodiments at least 75%, in other embodiments at least 80%, in other embodiments at least 85%, in other embodiments at least 90%, and in other embodiments at least 95% of its maximum height. In one or more embodiments, restricting step 26 occurs after the bulk foam material is at about 70%, in other embodiments about 75%, in other embodiments about 80%, in other embodiments about 85%, in other embodiments about 90%, and in other embodiments about 95% of its maximum height.

In other embodiments, where the opposing restriction implements themselves apply a force on the foam, the pressure applied to the top surface and/or the bottom surface of the foam is greater than 2 psi, in other embodiments greater than 4 psi, in other embodiments greater than 5 psi, and in other embodiments greater than 6 psi. In these or other embodiments, the pressure applied to the top surface and/or the bottom surface of the foam is less than 8 psi, in other embodiments, less than 7 psi, in other embodiments, less than 6 psi, and in other embodiments, less than 5 psi. In these or other embodiments, the pressure applied to the top surface and/or the bottom surface of the foam is about 2 to about 8 psi, in other embodiments, about 4 to about 7 psi, and in other embodiments about 5 psi to about 6 psi.

In one or more embodiments, restricting step 26 may occur for greater than 60 seconds, in other embodiments greater than 90 seconds, in other embodiments greater than 120 seconds, and in other embodiments greater than 150 seconds. In these or other embodiments, restricting step 26 may occur for less than 300 seconds, in other embodiments less than 240 seconds, in other embodiments less than 180 seconds, and in other embodiments less than 150 seconds. In these or other embodiments, restricting step 26 may occur for about 60 seconds to about 24 hours, in other embodiments from about 90 seconds to about 4 hours, in other embodiments from about 120 seconds to about 1 hour, in other embodiments from about 180 seconds to about 30 minutes, and in other embodiments about 240 seconds to about 10 minutes.

In one or more embodiments, restricting step 26 may occur within a certain time following depositing step 16. In one or more embodiments, restricting step 26 may occur within 40 seconds, in other embodiments within 60 seconds, in other embodiments within 80 seconds, in other embodiments within 100 seconds, in other embodiments within 150 seconds, and in other embodiments within 200 seconds following depositing step 16. In one or more embodiments, restricting step 26 may occur after 5 seconds, in other embodiments after 10 seconds, in other embodiments after 20 seconds, in other embodiments after 30 seconds, in other embodiments after 50 seconds, and in other embodiments after 70 seconds following depositing step 16.

In one or more embodiments, second restricting step 26 takes place at elevated temperatures. For example, the environmental temperature surrounding the board or boards being restricted is regulated at a higher temperature or a temperature that assists in the foam forming reaction. As the skilled person will appreciate, the foam forming reaction is exothermic, and therefore the environmental temperature can be regulated by preventing or inhibiting energy loss from the environment surrounding the board or boards. In other embodiments, the surrounding environment is heated from external heaters such as gas or electric heaters. In one or more embodiments, the environment surrounding the board or boards during restricting step 26 is greater than 40° C., in other embodiments greater than 50° C., and in other embodiments greater than 60° C. In one or more embodiments, the temperature is maintained at from about 20 to about 120° C., in other embodiments from about 40 to about 100° C., and in other embodiments from about 60 to about 80° C.

Optional Steps

As suggested above, the process of the invention may include various optional steps. For example, the process may include a cooling step to bring the foam boards or continuous foam product to a temperature near room temperature. In one or more embodiments, the cooling step may provide active cooling, such as in a cooling tower with cooling water as a cooling medium. In other embodiments, the cooling step may provide passive cooling where the foam boards or continuous foam product are simply allowed to cool to a temperature at or near room temperature by ambient air. Cooling step may include providing each of the foam boards to its own respective cooling rack. The plurality of cooling racks may be contained within a cooling tower. The cooling rack may provide restriction implements for providing a subsequent restriction step 26 in accord with the discussion herein. In one or more embodiments, cooling step may occur for from 20 minutes to 90 minutes, in other embodiments, from 30 minutes to 80 minutes, and in other embodiments, from 40 minutes to 60 minutes.

In one or more embodiments, the foam boards are stacked into bundles. The stacks may include any suitable number of foam boards, up to and including a bundle of foam boards. In one or more embodiments, the stacks include two foam boards, in other embodiments three foam boards, in other embodiments four foam boards, and in other embodiments eight foam boards. Where a bundle of boards is utilized, the bundle may include 12 foam boards, in other embodiments 24 foam boards, and in other embodiments 48 foam boards. The stacked boards may also be subjected to restriction implements for providing a subsequent restriction step 26 in accord with the discussion herein.

In one or more embodiments, the boards produced by the present invention may be wrapped for shipment. The wrapping step generally serves to place each of the foam boards into plastic wrap. While the plastic wrap may provide some additional restriction of the continued expansion foam product, it should be understood that any plastic wrap cannot serve to adequately resist expansion of the boards.

Heating

In one or more embodiments, the invention may include a heating step that generally serves to apply additional heat to a foam board or to a stack or bundle of foam board. The heating step may include applying the additional heat during restricting step 26. The heating step may include applying heat at a temperature of at least 100° F., in other embodiments at least 120° F., in other embodiments at least 140° F., in other embodiments at least 150° F., in other embodiments at least 175° F., and in other embodiments at least 200° F., to a foam board or to a stack or bundle of foam board. In one or more embodiments, the heating step may include applying heat at a temperature of from 100° F. to 200° F., in other embodiments from 120° F. to 175° F., in other embodiments from 140° F. to 175° F., and in other embodiments from 150° F. to 170° F., to a foam board or to a stack or bundle of foam board. Again, heat according to these temperatures may be applied during restricting step 26.

Shipping

In one or more embodiments, the invention may include a shipping step that generally serves to prepare the foam boards for shipping to a desired location. Shipping location may include one or more further finishing steps prior to shipment, such as placing the stacked foam boards into further stacks, further wrapping the stacks of foam boards in plastic, forming bundles of the foam boards, and placing the bundles of foam boards onto trucks for shipment. The to-be-shipped boards may also be subjected to restriction implements for providing a subsequent restriction step 26 in accord with the discussion herein.

Second Embodiment—Restriction Prior to Cross Cutting

In a second embodiment of the invention, a second step of restricting takes place "in-line" prior to cross cutting the continuous composite. According to these embodiments, the second step of restricting occurs after a certain amount of the total foam reaction is achieved. This can be quantified relative to the total foam reaction (i.e. a percentage of the total reaction). In one or more embodiments, the second step of restricting occurs after 70%, in other embodiments after 75%, in other embodiments after 80%, in other embodiments after 85%, and in other embodiments after 90% of the foam reaction takes place.

Overall Method Properties

The methods of the present invention may result in improvements in achievable line speeds for foam production, which is the speed at which the conveyor receiving foam running through the laminator and through the cross-cutting operate. In one or more embodiments, the method provides for line speeds of greater than 50 feet/minute, in other embodiments greater than 60 feet/minute, in other embodiments greater than 70 feet/minute, and in other embodiments greater than 80 feet/minute. In these or other embodiments, the method utilizes a line speed of less than 130 feet/minute, in other embodiments less than 110 feet/minute, in other embodiments less than 90 feet/minute, and in other embodiments less than 70 feet/minute. In these or other embodiments, method 10 utilizes a line speed of about 50 to about 130 feet/minute, in other embodiments about 60 to about 110 feet/minute, in other embodiments about 70 to about 100 feet/minute, and in other embodiments about 80 to about 100 feet/minute.

Overall Product Board Properties

As suggested above, the foam boards produced by the method disclosed herein have low surface irregularities which generally leads to improved appearance and improved R-Value when compared to conventional foam boards. These improvements may be quantified as discussed below.

Advantageously, the method of the present invention produces foam boards having low surface irregularities in the planar surfaces thereof. The term low surface irregularities may be quantified, for example, with reference to the foam having knit-line thickness below certain threshold thicknesses. Based on the low surface irregularities of the planar surfaces, the foam boards of the present invention may have improved appearance and improved R-Value compared to conventional foam boards.

The improved appearance of the foam boards may be quantified based on the depth of the remaining ridges (i.e. knit-lines). In one or more embodiments, the foam boards have an average ridge depth of less than 0.125", in other embodiments, less than 0.08", in other embodiments less than 0.06", in other embodiments less than 0.04", in other embodiments less than 0.02", and in other embodiments less than 0.01". In these or other embodiments, the foam boards have a maximum depth of the deepest ridge of about 0.125", in other embodiments about 0.08", in other embodiments about 0.06", in other embodiments about 0.04", in other embodiments about 0.02", and in other embodiments about 0.01".

In one or more embodiments, the foam boards have an R-Value improvement per inch thickness (R-value/in) of greater than 0.1 BTU-in/(hr.*ft$^2$*° F.), in other embodiments, greater than 0.2 BTU-in/(hr.*ft$^2$*° F.), and in other embodiments greater than 0.3 BTU-in/(hr.*ft$^2$*° F.) relative to boards made without the restricting step. In these or other embodiments, the foam boards have an R-Value improvement per inch thickness (R-value/in) of about 0.1 BTU-in/(hr.*ft$^2$*° F.), in other embodiments about 0.2 BTU-in/(hr.*ft$^2$*° F.), and in other embodiments about 0.3 BTU-in/(hr.*ft$^2$*° F.) relative to boards made without the restricting step.

Board Foam Density/Index

The foam boards produced by the method disclosed herein may be characterized by density and index of the foam.

In one or more embodiments, the foam boards may be characterized by a foam density (ASTM C303) that is less than 2.5 pounds per cubic foot (12 kg/m$^2$), in other embodiments less than 2.0 pounds per cubic foot (9.8 kg/m$^2$), in other embodiments less than 1.9 pounds per cubic foot (9.3 kg/m$^2$), and still in other embodiments less than 1.8 pounds per cubic foot (8.8 kg/m$^2$). In these or other embodiments, the foam boards may be characterized by a foam density that is greater than 1.50 pounds per cubic foot (7.32 kg/m$^2$), or in other embodiments, greater than 1.55 pounds per cubic foot (7.57 kg/m$^2$).

Where the density of the foam is less than 2.5 pounds per cubic foot, it may be advantageous for the foam to be characterized by having an index of at least 120, in other embodiments at least 150, in other embodiments at least 175, in other embodiments at least 200, and in other embodiments at least 225, as determined by PIR/PUR ratio as determined by IR spectroscopy using standard foams of known index (where a ratio of 3 PIR/PUR generally correlates to an ISO Index of 300).

In other embodiments, the foam boards may be characterized by a foam density (ASTM C303) that is greater than 2.5 pounds per cubic foot (12.2 kg/m$^2$), in other embodiments greater than 2.8 pounds per cubic foot (13.7 kg/m$^2$), in other embodiments greater than 3.0 pounds per cubic foot (14.6 kg/m$^2$), and still in other embodiments greater than 3.5 pounds per cubic foot (17.1 kg/m$^2$). In these or other embodiments, the density of foam layer 12 of the recovery boards may be less than 20 pounds per cubic foot (97.6 kg/m²), in other embodiments less than 10 pounds per cubic foot (48.8 kg/m²), in other embodiments less than 6 pounds per cubic foot (29.3 kg/m²), in other embodiments less than 5.9 pounds per cubic foot (28.8 kg/m²), in other embodiments less than 5.8 pounds per cubic foot (28.3 kg/m²), in other embodiments less than 5.7 pounds per cubic foot (27.8 kg/m²), in other embodiments less than 5.6 pounds per cubic foot (27.3 kg/m²), and still in other embodiments less than 5.5 pounds per cubic foot (26.9 kg/m²).

Where the density of the foam is greater than 2.5 pounds per cubic foot, it may be advantageous for the foam to be characterized by an ISO Index, as determined by PIR/PUR ratio as determined by IR spectroscopy using standard foams of known index (note that ratio of 3 PIR/PUR provides an ISO Index of 300) of at least 180, in other embodiments at least 200, in other embodiments at least 220, in other embodiments at least 270, in other embodiments at least 285, in other embodiments at least 300, in other embodiments at least 315, and in other embodiments at least 325. In these or other embodiments, the ISO Index may be less than 360, in other embodiments less than 350, in other embodiments less than 340, and in other embodiments less than 335.

Use of Boards within Roofing System

In one or more embodiments, the foam construction boards made by the method discussed herein may be utilized in preparing a roofing system for flat or low-sloped roofs. The roofing systems may include a roof deck, a layer of the foam construction boards of the present invention, and a weather protective layer such as a membrane. As generally known to the skilled person, the foam boards may be applied to the roof deck in staggered parallel adjacent courses that abut one another. The foam boards are secured to the substrate to which they are applied (e.g. roof deck) by mechanical fastening or adhesive fastening. Once the foam boards have been applied to the roof deck, the roofing system may be completed by covering the substrate with the membrane.

Practice of the present invention is not necessarily limited by the particular roof deck, adhesive layer, and membrane employed in the roofing system. Exemplary roof decks may include concrete pads, steel decks, wood beams, and foamed concrete decks. Exemplary membranes may include cured rubber systems such as EPDM membranes, functionalized polyolefin copolymers systems such as TPO membranes, or asphalt-based systems such as modified asphalt membranes and/or built roof systems, and other conventional protective layers. Exemplary adhesives for the adhesive layer may include an adhesive that forms a bond through curing action such as is the case with a liquid bond adhesive (e.g. a butyl rubber adhesive) or a polyurethane adhesive. Other exemplary adhesives include pressure-sensitive adhesives, which may be applied to the membrane at the location where the membrane is manufactured (e.g. a factory-applied pressure-sensitive adhesive).

Various modifications and alterations that do not depart from the scope and spirit of this invention will become apparent to those skilled in the art. This invention is not to be duly limited to the illustrative embodiments set forth herein.

What is claimed is:

1. A method for producing a foam board laminate having low surface irregularities, the method comprising:
   (i) preparing a continuous foam laminate;
   (ii) cutting the foam laminate to a desired length to thereby form a foam board laminate, said foam board laminate having a length and thickness;
   (iii) placing the foam board laminate between a pair of opposing parallel plates to restrict further expansion of the foam laminate relative to the thickness of the foam board laminate.

2. The method of claim 1, where the continuous foam laminate includes opposed facers with foam disposed between the facers, where the facers define upper and lower planar surfaces of the board, where the upper and lower planar surfaces define a length and width of the board, and where the foam and the upper and lower facers define a thickness of the foam board laminate.

3. The method of claim 2, where the foam is a polyisocyanurate foam.

4. The method of claim 1, where said step of preparing includes mixing an A-side stream of reactants including an isocyanate with a B-side stream of reactants including an isocyanate-reactive compound to thereby form a foam mixture.

5. The method of claim 4, where the foam mixture is deposited, from multiple mix heads, onto one of the upper and lower facers, and further comprising the step of marrying the other of the upper and lower facer to the foam mixture.

6. The method of claim 1, where said step of preparing a continuous foam laminate includes restricting the foam laminate within a laminator.

7. The method of claim 1, where said step of cutting includes cross cutting.

8. A method for producing a foam board having low surface irregularities, the method comprising:
   (i) mixing an A-side stream and a B-side stream to thereby form a foam mixture;
   (ii) depositing the foam mixture onto a production line;
   (iii) allowing the foam mixture to expand for at least 20 seconds to thereby obtain an intermediate foam product;
   (iv) cross-cutting the intermediate foam product to thereby obtain a foam board; and
   (v) restricting the foam board between a pair of opposing parallel plates from further expansion in at least one direction.

9. The method of claim 8, where the pair of opposing restriction implements are acted on by a tool selected from a lever or screw, such that the opposing restriction implements act as a vise-like apparatus.

10. The method of claim 8, where the pair of opposing restriction implements are fixedly positioned to a desired thickness for a final foam product.

11. The method of claim 8, where the foam expands at a rate defined by a bulk vertical expansion rate, and where the bulk vertical expansion rate is from 102 to 110% of a knit-line vertical expansion rate.

12. The method of claim 8, where the foam board has a height, and where the restricting step maintains the height of a bulk foam material at a maximum height of from 100.2% to 103% of a maximum height of a knit-line foam material.

13. The method of claim 12, where the restricting step maintains the height of the bulk foam material at a maximum height of about 103% of a maximum height of the knit-line foam material.

14. The method of claim 8, further comprising a step (vi) of collecting, following the step of restricting, a final foam product having a knit-line foam material thickness and a bulk foam material thickness, wherein the knit-line foam material thickness is at least 96% of the bulk foam material thickness.

15. The method of claim 14, where the knit-line foam material thickness is about 1.92 inches, and wherein the bulk foam material thickness is about 2.0 inches.

16. The method of claim 14, where the knit-line foam material thickness is about 1.96 inches, and wherein the bulk foam material thickness is about 2.0 inches.

17. The method of claim 12, where the bulk foam material thickness is greater than the knit-line foam material thickness, such that a difference between the bulk foam material thickness and the knit-line foam material thickness defines a knit-line thickness, wherein the knit-line thickness is less than 0.125 inches.

18. The method of claim 17, wherein the knit-line thickness is less than 0.04 inches.

* * * * *